(12) United States Patent
Katayama (10) Patent No.: US 6,574,275 B1
(45) Date of Patent: Jun. 3, 2003

(54) DECODING APPARATUS AND DECODING METHOD

(75) Inventor: Hiroshi Katayama, Chiba (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/486,299

(22) PCT Filed: Jun. 24, 1999

(86) PCT No.: PCT/JP99/03364
§ 371 (c)(1),
(2), (4) Date: May 16, 2000

(87) PCT Pub. No.: WO00/01157
PCT Pub. Date: Jan. 6, 2000

(30) Foreign Application Priority Data

Jun. 26, 1998 (JP) .......................................... 10-180929

(51) Int. Cl.[7] ................................................. H04N 7/18
(52) U.S. Cl. ........................... 375/240.05; 375/240.18; 375/240.2; 375/240.25
(58) Field of Search ........................ 375/240.12–240.29

(56) References Cited

U.S. PATENT DOCUMENTS 5,644,361 A * 7/1997 Ran et al. ............... 375/240.16
5,847,762 A * 12/1998 Canfield et al. ........ 375/240.15
6,028,635 A * 2/2000 Owen et al. ................. 348/699
6,157,740 A * 12/2000 Buerkle et al. ........ 375/240.18

FOREIGN PATENT DOCUMENTS

| JP | 8-18953 | 1/1996 |
| JP | 8-116539 | 5/1996 |
| JP | 8-205161 | 8/1996 |
| JP | 8-289302 | 11/1996 |
| JP | 9-261635 | 10/1997 |
| JP | 9-331527 | 12/1997 |

* cited by examiner

Primary Examiner—Andy Rao
(74) Attorney, Agent, or Firm—Lerner, David, Littenberg, Krumholz & Mentlik, LLP (57) ABSTRACT

A data compressing circuit to compress an amount of data which is stored into an image memory is provided at the front stage of the image memory which is used for a motion compensation prediction. A data decompressing circuit to return the compression data read out from the image memory to the original data is provided at the post stage of the image memory. Since the image data is compressed when reference image data is stored into the image memory which is used for motion compensation prediction, a capacity of the image memory is reduced. In this instance, since the compression of the image data is independently performed on a unit basis of a DCT block layer, it can be matched with a DCT block and successive processes can be performed.

14 Claims, 8 Drawing Sheets

DECODING APPARATUS AND DECODING METHOD

TECHNICAL FIELD

The invention relates to a decoding apparatus and a decoding method for performing decoding of, for example, MPEG2 and, more particularly, to a reduction of a memory capacity of an image memory which is used for motion prediction.

BACKGROUND ART

A satellite digital television broadcasting for broadcasting a digital video signal by using a satellite has been started. A ground wave digital television broadcasting for broadcasting a digital video signal by using a ground wave is being developed. In the digital television broadcasting, it is expected to perform various services such as high definition television broadcasting, multichannel broadcasting, multimedia broadcasting, and the like.

In the digital television broadcasting, for example, MPEG2 (Moving Picture Experts Group) 2 is used as an image compression system. According to MPEG2 system, a video signal is compression encoded by a motion compensation predictive coding and a DCT (Discrete Cosine Transformation). In the MPEG2 system, three kinds of picture planes called an I (Intra) picture, a P (Predictive) picture, and a B (Bidirectionally Predictive) picture are transmitted. In the I picture, DCT coding is performed by using pixels of the same frame. In the P picture, DCT coding using a motion compensation prediction is performed with reference to the I picture or P picture which has already been encoded. In the B picture, DCT coding using a motion prediction is performed with reference to the I pictures or P pictures before and after the target picture.

A decoding circuit of MPEG2 is provided for a digital television receiver for receiving a digital television broadcasting which is transmitted by using such an MPEG2 system. The decoding circuit of MPEG2 can be constructed as shown in, for example, FIG. 1.

Figure 1:
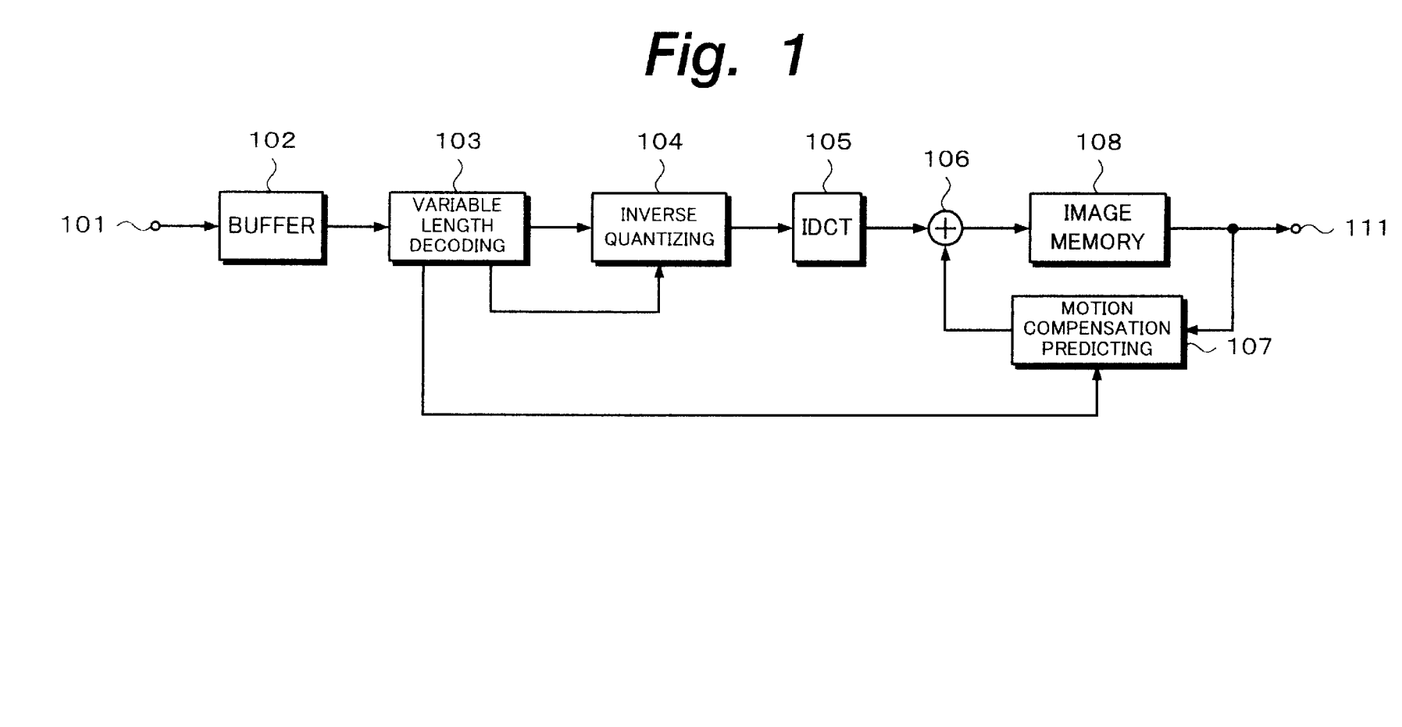
FIG. 1 is a block diagram of an example of a conventional MPEG2 decoder.

In FIG. 1, a bit stream of MPEG2 is supplied to an input terminal 101. The bit stream is once accumulated in a buffer memory 102.

An output of the buffer memory 102 is supplied to a variable length decoding circuit 103. Decoding is performed on a macroblock unit basis in the variable length decoding circuit 103. Coefficient data of DCT and a motion vector are outputted from the variable length decoding circuit 103. Further, various control data showing a frame frequency of the video signal and data such as predicting mode, quantization scale, and the like are outputted from the variable length decoding circuit 103.

The DCT coefficient data comprising (8×8) pixels is supplied to an inverse quantizing circuit 104. The quantization scale of the inverse quantizing circuit 104 is set in accordance with quantization scale information from the variable length decoding circuit 103. Motion vector information and predicting mode information are supplied to a motion compensating circuit 107.

The DCT coefficient data is inversely quantized by the inverse quantizing circuit 104. An output of the inverse quantizing circuit 104 is supplied to an IDCT circuit 105. An output of the IDCT circuit 105 is supplied to an adding circuit 106. An output of the motion compensating circuit 107 is supplied to the adding circuit 106.

An image memory 108 holds video images of two frames for a reference picture plane and one field image for converting a frame image in a macroblock into a field when the B picture is outputted.

In the I picture, since the DCT coding is performed by using the pixels of the same frame, in case of the I picture, image data of a picture plane of one frame is obtained from the IDCT circuit 105. The image data is outputted from an output terminal 111 through the adding circuit 106 and image memory 108. The image data in this instance is accumulated as data of the reference picture plane into the image memory 108.

In the P picture, the DCT coding using the motion compensation prediction is performed with reference to the I picture or P picture. Therefore, differential data between the target picture plane and the reference picture plane is outputted from the IDCT circuit 105. Data of the reference picture plane has been accumulated in the image memory 108. The motion vector is supplied from the variable length decoding circuit 103 to the motion compensating circuit 107. In case of decoding the P picture, the image of the reference frame from the image memory 108 is motion compensated by the motion compensating circuit 107 and supplied to the adding circuit 106. The adding circuit 106 adds the data of the motion compensated reference image and the differential data from the IDCT circuit 105. Thus, data of a picture plane of one frame is obtained. The image data at this time is stored as data of the reference picture plane into the image memory 108.

In the B picture, the DCT coding using the motion prediction is performed with reference to the I pictures or P pictures before and after the target picture. Therefore, differences between the B picture plane and the reference picture planes before and after the target picture plane are outputted from the IDCT circuit 105. The data of the reference picture planes before and after the target picture plane has been stored in the image memory 108. In case of decoding the B picture, the images of the reference frames before and after the target picture plane from the image memory 108 are motion compensated by the motion compensating circuit 107 and supplied to the adding circuit 106. The adding circuit 106 adds the data of the motion compensated reference images before and after the target picture plane and the differential data from the IDCT circuit 105. Thus, data of a picture plane of one frame is obtained.

As mentioned above, as for the digital video signal of the MPEG2 system, there are the I picture, P picture, and B picture. In the P picture and B picture, the image data stored in the image memory 108 is used as data of the reference images. Therefore, as an image memory, a memory capacity of at least two frames is necessary. Further, a memory capacity of one field is necessary to convert a frame image in the macroblock into a field picture plane when the image of the B picture is outputted. Therefore, a capacity of at least (2 frames+1 field) is necessary as a capacity of the image memory. For example, in case of decoding the picture plane of a high definition television broadcasting of (1920 pixels× 1080 lines), a memory capacity of about 80 Mbits or more is necessary. Since the memory capacity increases as mentioned above, costs increase and it is difficult to miniaturize.

Particularly, the use of a DRAM as such an image memory is considered. Although the DRAM of 64 Mbits has been spread, since the memory capacity that is required as a capacity of the image memory exceeds 64 Mbits, a desired image memory cannot be constructed if one DRAM of 64 Mbits is used. If two DRAMs of 64 Mbits are used or a DRAM of 128 Mbits is used, the memory capacity becomes in vain.

It is, therefore, an object of the invention to provide a decoding apparatus and a decoding method which can reduce a capacity of an image memory for accumulating reference picture planes which are used for a motion compensation prediction and can realize a miniaturization, a light weight, and a reduction of costs.

DISCLOSURE OF INVENTION

According to the invention, there is provided a decoding apparatus comprising: data input means for inputting image data compressed by a motion compensation predictive coding and a DCT (Discrete Cosine Transformation); variable length decoding means for decoding various parameters and quantization DCT coefficients from the data input means; inverse quantizing means for inversely quantizing the quantization DCT coefficients; inverse DCT means for inversely DCT transforming the DCT coefficients which were inversely quantized; motion compensation predicting means for obtaining a motion compensation predictive value; arithmetic operating means for adding reference data which was motion compensated by the motion compensation predicting means and an output of the inverse DCT means; an image memory for storing the reference data which is used for the motion compensation prediction and data for display; and data output means for outputting decoded image data, wherein data compressing means for compressing an amount of data which is stored in the image memory is provided at the front stage of the image memory, and data decompressing means for decompressing the compression data read out from the image memory to the original data is provided at the post stage of the image memory.

According to the invention, there is provided a decoding method of decoding image data compressed by a motion compensation predictive coding and a DCT (Discrete Cosine Transformation), comprising the steps of: obtaining various parameters and quantization DCT coefficients from the image data by variable length coding; inversely quantizing the quantization DCT coefficients; inversely DCT transforming the DCT coefficients which were inversely quantized; performing the motion compensation prediction on the basis of the predetermined parameters which were variable length decoded and outputting reference data; arithmetically operating the outputted reference data and the inversely DCT transformed output; compressing a result of the arithmetic operation and storing it into a reference image memory; and decompressing the data stored in the reference image memory and performing a motion compensation.

The image data is compressed when data of a reference picture plane is stored into the image memory which is used for the motion compensation prediction. Thus, a memory capacity of the image memory which is used for the motion compensation prediction can be reduced, a circuit scale can be reduced, and costs can be shaved. In this instance, since the compression of the image data is performed independently on a unit basis of a block layer of the DCT, it can be matched with the DCT block and successive processes can be performed.

BEST MODE FOR CARRYING OUT THE INVENTION

Figure 2:
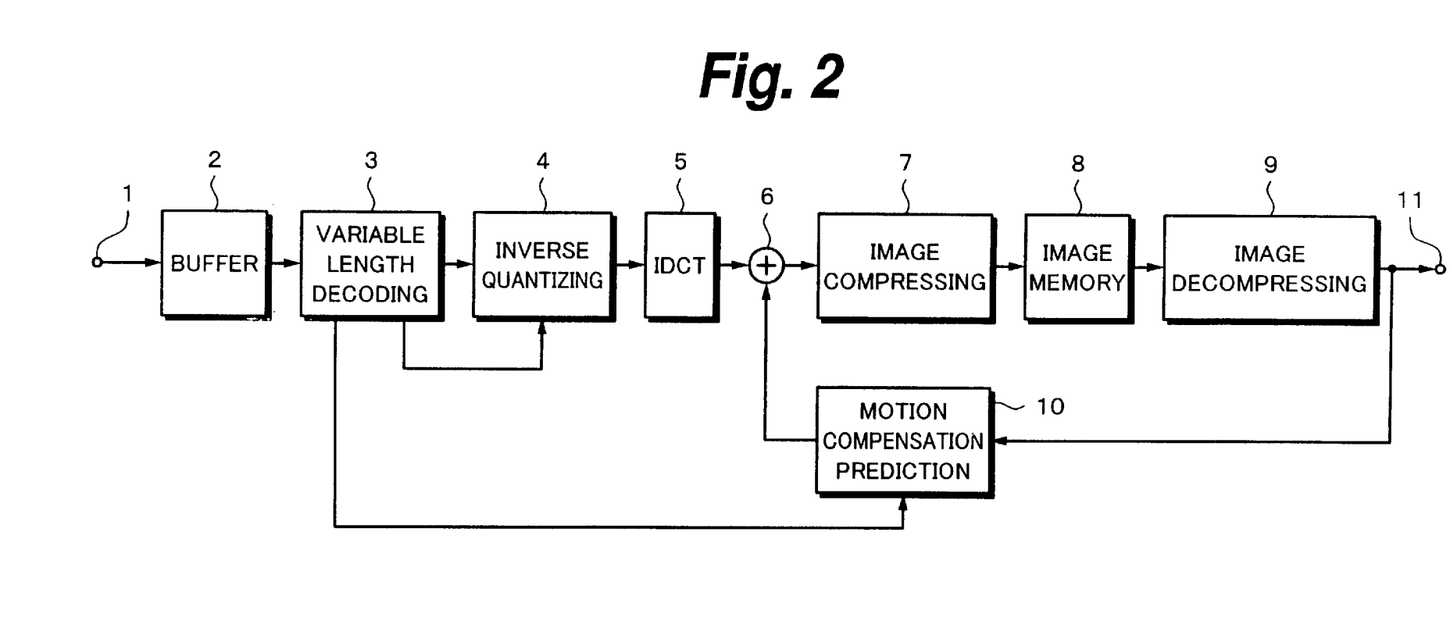
FIG. 2 is a block diagram of an example of an MPEG2 decoder to which the invention is applied.

An embodiment of the invention will be described hereinbelow with reference to the drawings. FIG. 2 shows an example of a decoding circuit of MPEG2 to which the invention is applied. In FIG. 2, a bit stream of MPEG2 is supplied to an input terminal 1. The bit stream is once stored into a buffer memory 2.

According to the MPEG2 system, three kinds of picture planes called an I picture, a P picture, and a B picture are transmitted. In the I picture, DCT coding is performed by using pixels of the same frame. In the P picture, a DCT coding using a motion compensation prediction is performed with reference to the I picture or P picture which has already been encoded. In the B picture, DCT coding using a motion prediction is performed with reference to the I pictures or P pictures before and after the target picture.

An output of the buffer memory 2 is supplied to a variable length decoding circuit 3. Coding information of a macroblock is decoded by the variable length decoding circuit 3.

Coefficient data of DCT and data such as motion vector, predicting mode, quantization scale, and the like are outputted from the variable length decoding circuit 3. The DCT coefficient data comprising (8×8) pixels from the variable length decoding circuit 3 is supplied to an inverse quantizing circuit 4. The quantization scale of the inverse quantizing circuit 4 is set in accordance with quantization scale information from the variable length decoding circuit 3. Motion vector information and predicting mode information are supplied to a motion compensating circuit 10.

The DCT coefficient data is inversely quantized by the inverse quantizing circuit 4. An output of the inverse quantizing circuit 4 is supplied to an IDCT circuit 5. An output of the IDCT circuit 5 is supplied to an adding circuit 6. An output of the motion compensating circuit 10 is supplied to the adding circuit 6. An output of the adding circuit 6 is supplied to an image memory 8 through an image compressing circuit 7. An output of the image memory 8 is supplied to an output terminal 11 through an image decompressing circuit 9 and supplied to the motion compensating circuit 10.

The image memory 8 holds video images of two frames for a reference picture plane and one field image for converting a frame image in a macroblock into a field when the B picture is outputted.

In the I picture, since the DCT coding is performed by using the pixels of the same frame, in case of the I picture, data of a picture plane of one frame is obtained from the IDCT circuit 5. The image data is taken out from the output terminal 11 through the adding circuit 6, image compressing circuit 7, image memory 8, and image decompressing circuit 9. The image data in this instance is accumulated as data of the reference picture plane into the image memory 8.

In the P picture, the DCT coding using the motion compensation prediction is performed with reference to the I picture or P picture. Therefore, differential data between the target picture plane and the reference picture plane is outputted from the IDCT circuit 5. Data of the reference picture plane has been compressed and accumulated in the image memory 8. The motion vector is supplied from the variable length decoding circuit 3 to the motion compensating circuit 10.

In case of decoding the P picture, the image of the reference frame from the image memory 8 is decompressed by the image decompressing circuit 9, motion compensated by the motion compensating circuit 10, and supplied to the adding circuit 6. The adding circuit 6 adds the data of the motion compensated reference image and the differential data from the IDCT circuit 5. Thus, data of a picture plane of one frame is obtained. The image data at this time is compressed by the image compressing circuit 7 and stored as data of the reference picture plane into the image memory 8.

In the B picture, the DCT coding using the motion prediction is performed with reference to the I pictures or P pictures before and after the target picture. Therefore, differential data between the B picture plane and the reference picture planes before and after the target picture plane is outputted from the IDCT circuit 5. The data of the reference picture planes before and after the target picture plane has been compressed and stored in the image memory 8.

In case of decoding the B picture, the images of the reference frames before and after the target picture plane from the image memory 8 are decompressed into the original image data by the image decompressing circuit 9, motion compensated by the motion compensating circuit 10, and supplied to the adding circuit 6. The adding circuit 6 adds the data of the motion compensated reference images before and after the target picture plane and the differential data from the IDCT circuit 5. Thus, data of a picture plane of one frame is obtained.

As mentioned above, the image compressing circuit 7 is provided for the decoding circuit of MPEG2 to which the invention is applied and the data is compressed and accumulated in the image memory 8. Therefore, there is no need to use a memory of a large capacity as an image memory. For example, even in case of handling a picture plane of a high definition television comprising (1920×1080) pixels per frame, the image memory 8 can be constructed by a memory chip of 64 Mbits.

Figure 3:
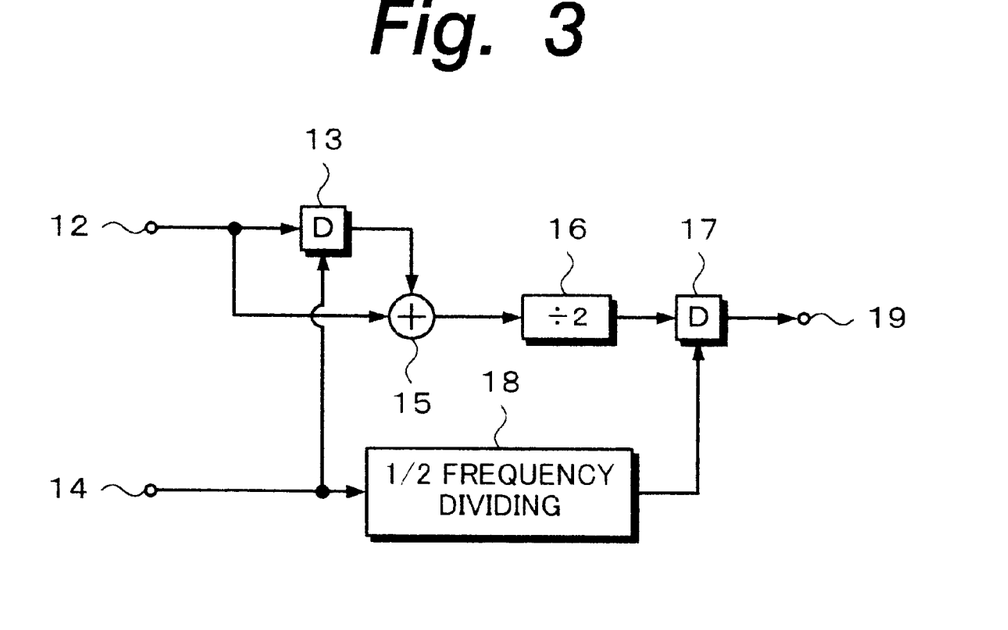
FIG. 3 is a block diagram of an example of an image compressing circuit in the MPEG2 decoder to which the invention is applied.

FIG. 3 shows an example of a data compressing circuit. In FIG. 3, a video signal is supplied to an input terminal 12. The video signal is supplied to a delay circuit 13 and supplied to an adding circuit 15. The video data from the input terminal 12 is delayed by time of one sample by the delay circuit 13. An output of the delay circuit 13 is supplied to the adding circuit 15. The data from the input terminal 12 and the data delayed by the time of one sample through the delay circuit 13 are added by the adding circuit 15.

An output of the adding circuit 15 is supplied to a dividing circuit 16. An output value of the adding circuit 15 is divided into ½ by the dividing circuit 16. Thus, the dividing circuit 16 averages two adjacent data at the input terminal 12 and continuously outputs a result.

An output of the dividing circuit 16 is supplied to a delay circuit 17. A clock from a clock input terminal 14 is supplied to the delay circuit 17 through a ½ frequency dividing circuit 18. In the delay circuit 17, the output data of the dividing circuit 16 is fetched by a clock of a frequency of a half of that of the clock from the clock input terminal 14. Thus, every two data at the input terminal 12 is averaged and the data whose data amount is divided into ½ is outputted to an output terminal 19.

Figure 4:
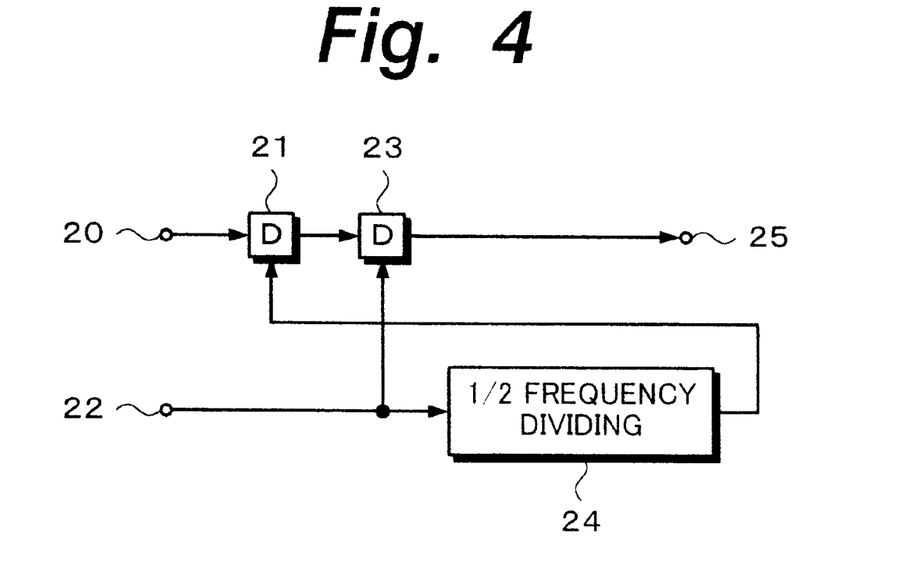
FIG. 4 is a block diagram of an example of an image decompressing circuit in the MPEG2 decoder to which the invention is applied.

FIG. 4 shows a construction of the image decompressing circuit 9. In FIG. 4, compression data is supplied to a data input terminal 20. The compression data is supplied to a delay circuit 21. A clock is supplied from a clock input terminal 22 to the delay circuit 21 through a ½ frequency dividing circuit 24. The data from the data input terminal 20 is delayed by this clock.

An output of the delay circuit 21 is supplied to a delay circuit 23. The clock from the clock input terminal 22 is supplied to the delay circuit 23. An output of the delay circuit 23 is outputted from an output terminal 25.

As mentioned above, the data is fetched in the delay circuit 21 by the clock from the clock input terminal 22. This data is fetched in the delay circuit 23 by the clock transmitted through the ½ frequency dividing circuit 24. Therefore, the same continuous data is outputted twice from the delay circuit 23 and the data amount is doubled.

Figure 5:
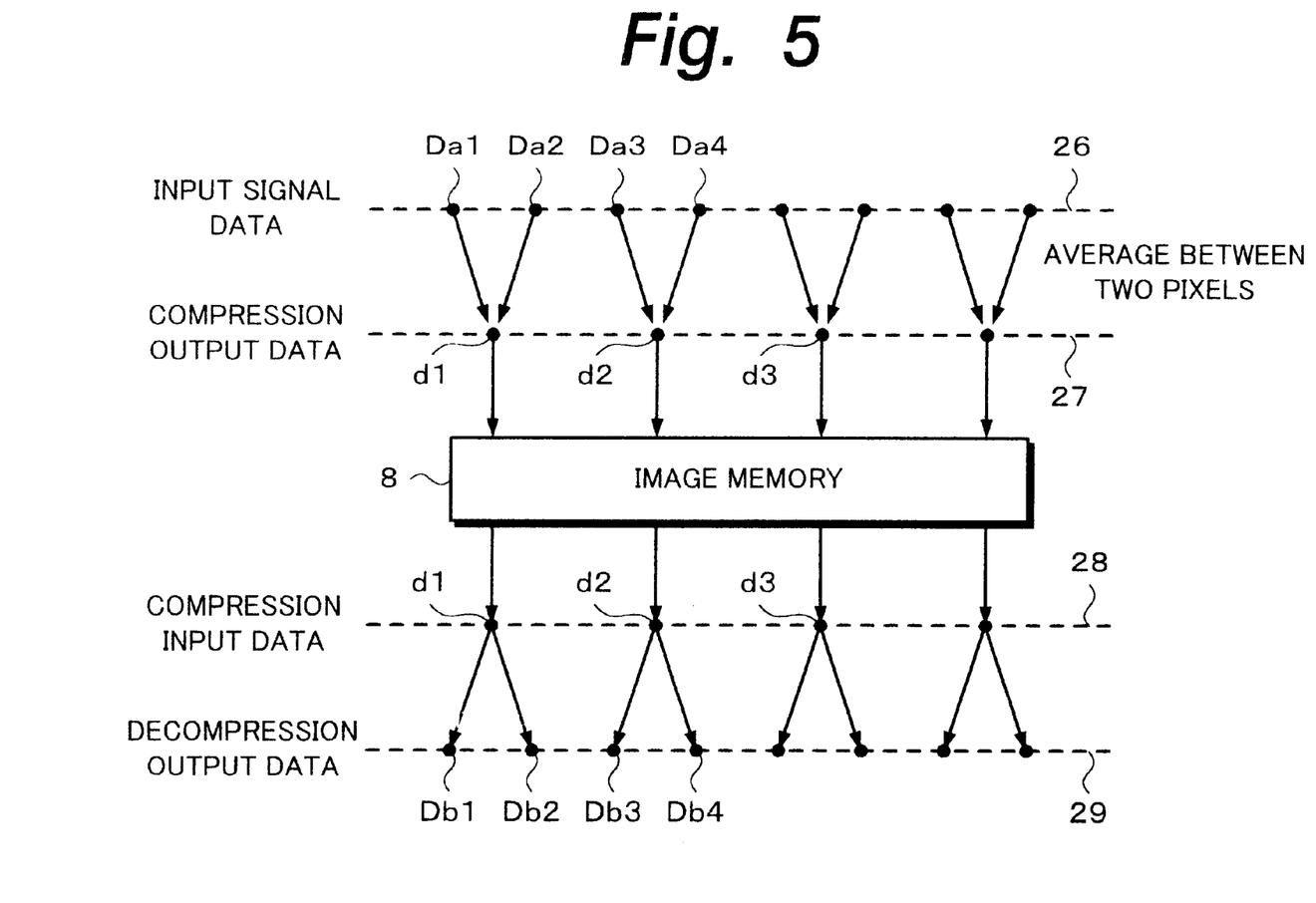
FIG. 5 is a schematic diagram for use in explanation of the image decompressing circuit.

FIG. 5 shows processes when the data is compressed by using the average values as mentioned above. As shown in FIG. 5, input data Da1, Da2, Da3, Da4, . . . of eight samples is compressed into ½ by the average value of the data of two adjacent samples by the image compressing circuit 7, respectively. The input data Da1, Da2, Da3, Da4, . . . of eight samples is taken out on a unit basis of a block layer of (8×8) of an MPEG coding bit stream. Thus, independent processes can be performed on a block layer unit basis of (8×8). Data d1, d2, d3, . . . of the average values of the data of two adjacent samples is accumulated in the image memory 8.

Upon decompression, the output data d1, d2, d3, . . . from the image memory 8 is sent to the image decompressing circuit 9. The image decompressing circuit 9 continuously outputs the data of two samples. Thus, data Db1, Db2, Db3, Db4, . . . corresponding to the original data Da1, Da2, Da3, . . . is outputted from the image decompressing circuit 9.

Although the data has been compressed by using the average values in the above example, the data can be compressed by merely decimating the data by performing a band limitation. In this case, upon data decompression, the same data is repeated continuously or the data is interpolated by the average value.

Figure 6:
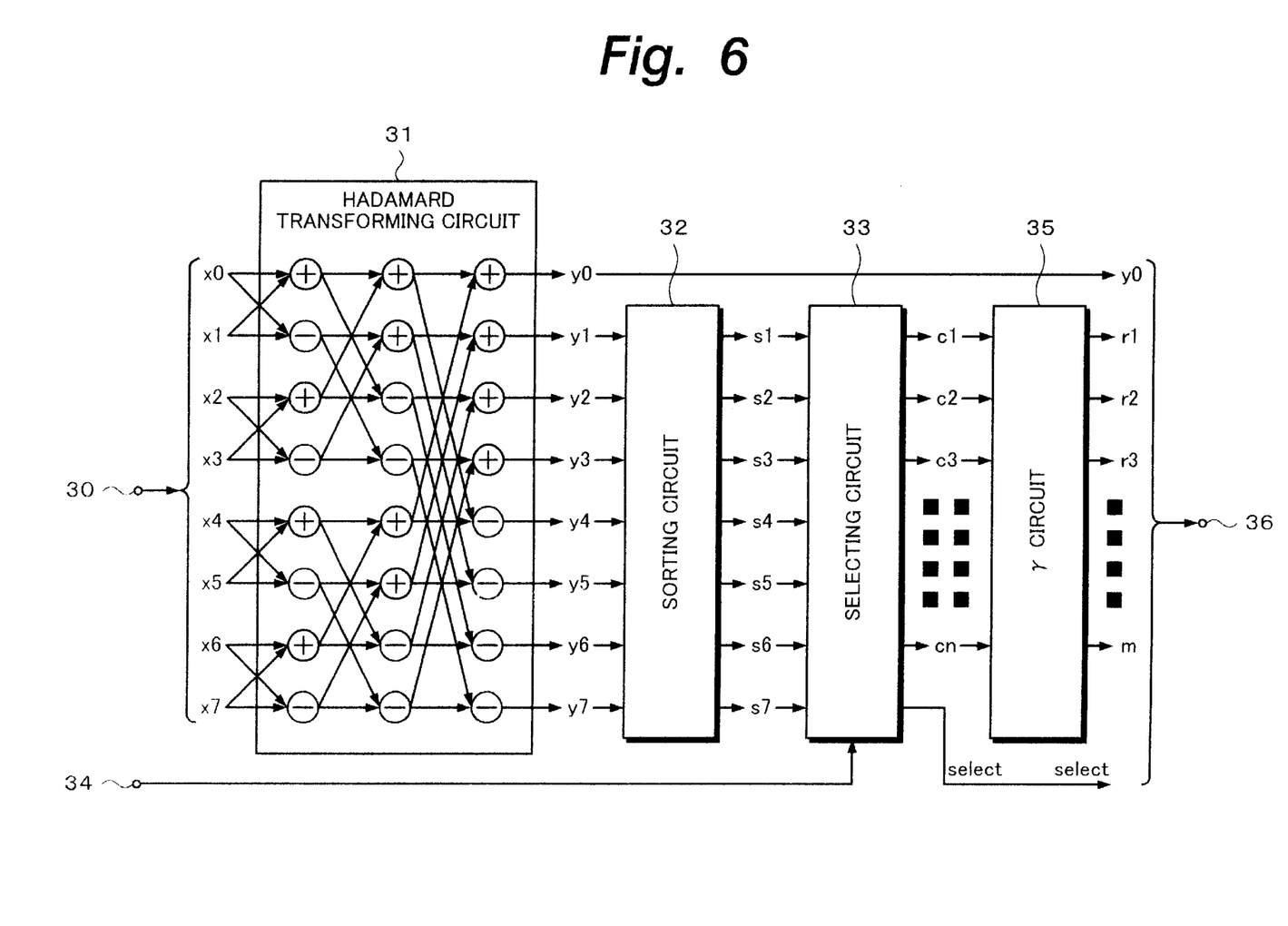
FIG. 6 is a block diagram of another example of an image compressing circuit in the MPEG2 decoder to which the invention is applied.

Further, although the above example relates to what is called a fixed compression system in which the ratio of the data amount before compression and the data amount after the compression is always constant, a compression system in which a data amount varies can be used. As such an example, there is a system using, for instance, an Hadamard transformation. FIG. 6 shows a case where the data which is accumulated in the image memory 8 is compressed by using the Hadamard transformation.

In FIG. 6, a video signal inputted to an input terminal 30 is supplied to an Hadamard transforming circuit 31 as data x0 to x7 every 8 pixels of each line in a DCT block constructed by (8×8) in the MPEG system.

In the Hadamard transforming circuit 31, an octenary Hadamard transformation is constructed by 24 adders/subtractors. The Hadamard transforming circuit 31 receives the pixel data x0 to x7 and transforms data of a time region into data of a frequency region. Among output data y0 to y7, y0 is set to a DC component and y1 to y7 are set to AC components of different frequencies and phases. In this case, generally, although the value of y0 uniformly changes from a small value to a large value, there is a tendency such that y1 to y7 are concentrated to relatively small values. Particularly, a high frequency component has a small value.

An output of the Hadamard transforming circuit 31 is supplied to a sorting circuit 32. The sorting circuit 32 compares absolute values of the values of y1 to y7 of the AC components which are outputted from the Hadamard transforming circuit 31 and orders y1 to y7 of the AC components in order from the large absolute value.

An output of the sorting circuit 32 is supplied to a selecting circuit 33. A control signal indicative of the number of sort data to be outputted is supplied from a selection control input terminal 34 to the selecting circuit 33.

Among data s1 to s7 outputted from the sorting circuit 32, the selecting circuit 33 selects the data in order from the data of a large value in accordance with the number designated by the control signal from the control input terminal 34 and generates them as outputs c1 to cn.

That is, among the AC components y1 to y7, the selecting circuit 33 provides a function to select preferentially the data of a large amplitude. A selection signal is outputted from the selecting circuit 33. The selection signal is a signal indicating which data was selected.

An output of the selecting circuit 33 is supplied to a gamma circuit 35. The gamma circuit 35 performs what is called a gamma process to the data generated from the selecting circuit 33, thereby suppressing a dynamic range of the data and further reducing the data amount.

Outputs r1 to rn of the gamma circuit 35 and the selection signal from the selecting circuit 33 are outputted from a compression data output terminal 36 and accumulated into the image memory 8.

As mentioned above, the data of the time region is transformed to the data of the frequency region by the Hadamard transforming circuit 31. Only the data of the large absolute values among the data of the frequency region is extracted. Thus, a data amount of the data which is stored in the image memory 8 can be reduced. Since the Hadamard transformation is performed every 8 pixels of each line in the (8×8) block of the DCT, it can be matched with the decoding process.

Although the Hadamard transformation is performed every 8 pixels of each line in the (8×8) block of the DCT in the above example, the Hadamard transformation can be performed every (8×8) block of the DCT. The Hadamard transformation can be performed on a macroblock unit basis.

Figure 7:
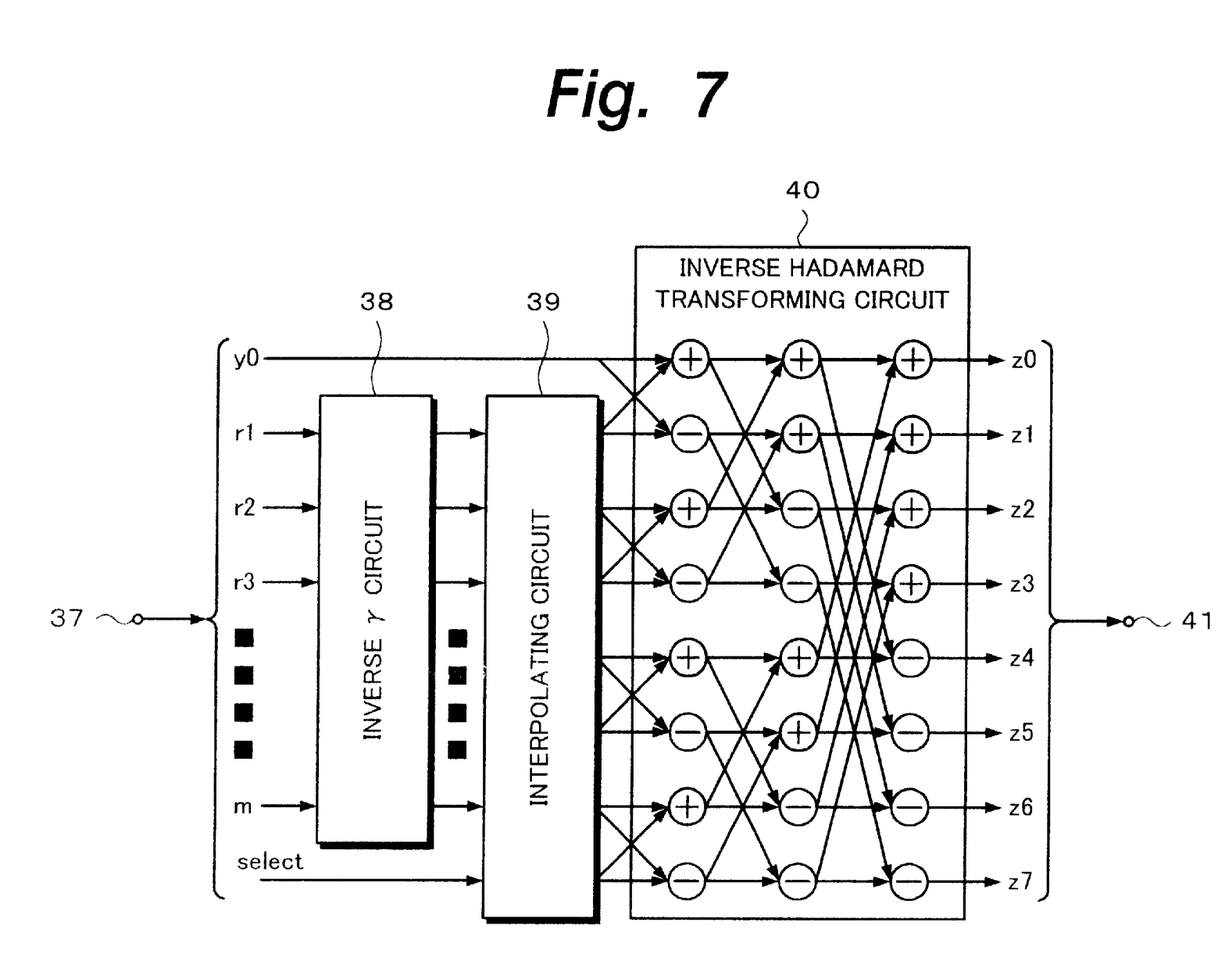
FIG. 7 is a block diagram of another example of an image decompressing circuit in the MPEG2 decoder to which the invention is applied.

FIG. 7 shows a construction of the image decompressing circuit 9 in the case where the data compression is performed by the Hadamard transformation. In FIG. 7, compression data is supplied to an input terminal 37. In the compression data, the data y0 of a DC component is supplied to an inverse Hadamard transforming circuit 40. The data r1 to rn is supplied to an inverse gamma circuit 38. A selection signal shows which data among Hadamard coefficients was selected. This selection signal is supplied to an interpolating circuit 39.

The inverse gamma circuit 38 performs an inverse gamma process of characteristics opposite to those of the gamma circuit 35, thereby returning the dynamic range of the data to the original range. An output of the inverse gamma circuit 38 is supplied to the interpolating circuit 39.

On the basis of the selection signal which is supplied from the compression data input terminal 37, the interpolating circuit 39 substitutes 0 for the Hadamard coefficients deleted by the selecting circuit 33 and supplies it to the post stage. An output of the interpolating circuit 39 is supplied to the inverse Hadamard transforming circuit 40.

The inverse Hadamard transforming circuit 40 inversely Hadamard transforms the Hadamard transformation coefficients supplied from the interpolating circuit 39 by using the DC component y0 supplied from the compression data input terminal 37 as an input value and outputs the decompressed data to an output terminal 41.

By using the average value data of the adjacent samples or using the Hadamard transformation as mentioned above, an amount of data which is stored in the image memory 8 can be reduced. A memory of a small capacity can be used as an image memory 8, so that the circuit scale can be reduced and costs can be shaved.

In case of compressing the data by the Hadamard transformation and storing into the image memory 8, a circuit to perform a transformation opposite to the Hadamard transformation is necessary, so that there is a fear of an increase in circuit scale. However, since the Hadamard transformation can be performed by a simple addition/subtraction, the circuit scale does not remarkably increases. Particularly, since the Hadamard transforming circuit and the inverse transforming circuit can be integrated together with the other decoding circuit, the circuit scale does not physically increase.

Although the Hadamard transformation is used in the above example, another orthogonal transformation code, for example, a Wavelet transformation, a DCT transformation, a high speed Fourier transformation, or the like can be used.

Figure 8:
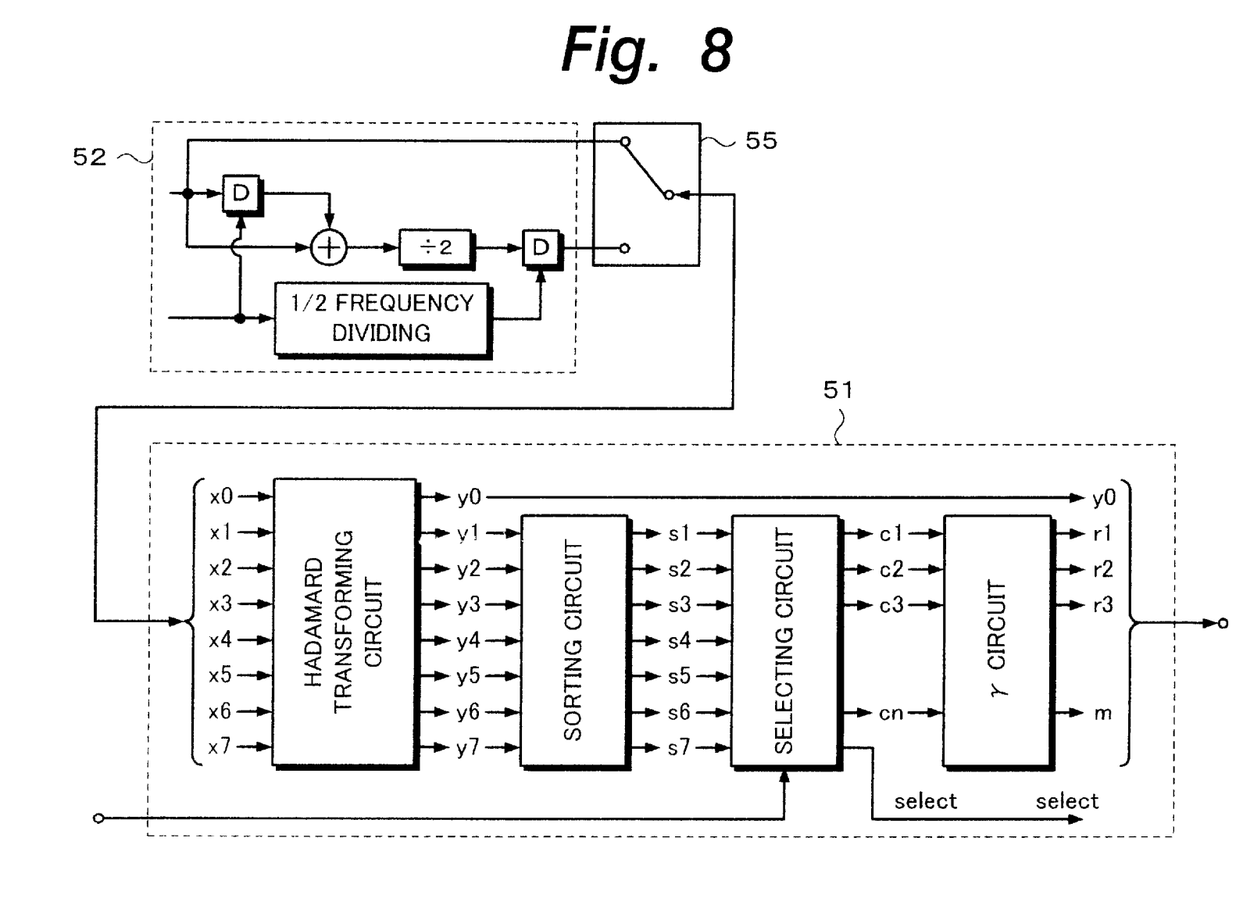
FIG. 8 is a block diagram of further another example of an image compressing circuit in the MPEG2 decoder to which the invention is applied.

Although the amount of data stored in the image memory has been reduced by using the average value data of the adjacent samples or using the Hadamard transformation in the above example, a combination of them is also possible. That is, as shown in FIG. 8, a compressing circuit 52 of data by an average value can be provided at the front stage of a data compressing circuit 51 based on the Hadamard transformation. In this case, as shown in FIG. 9, a decompressing circuit comprises a combination of: a decompressing circuit 53 of data based on the Hadamard transformation; and a decompressing circuit 54 of data by the average value of the data.

Figure 9:
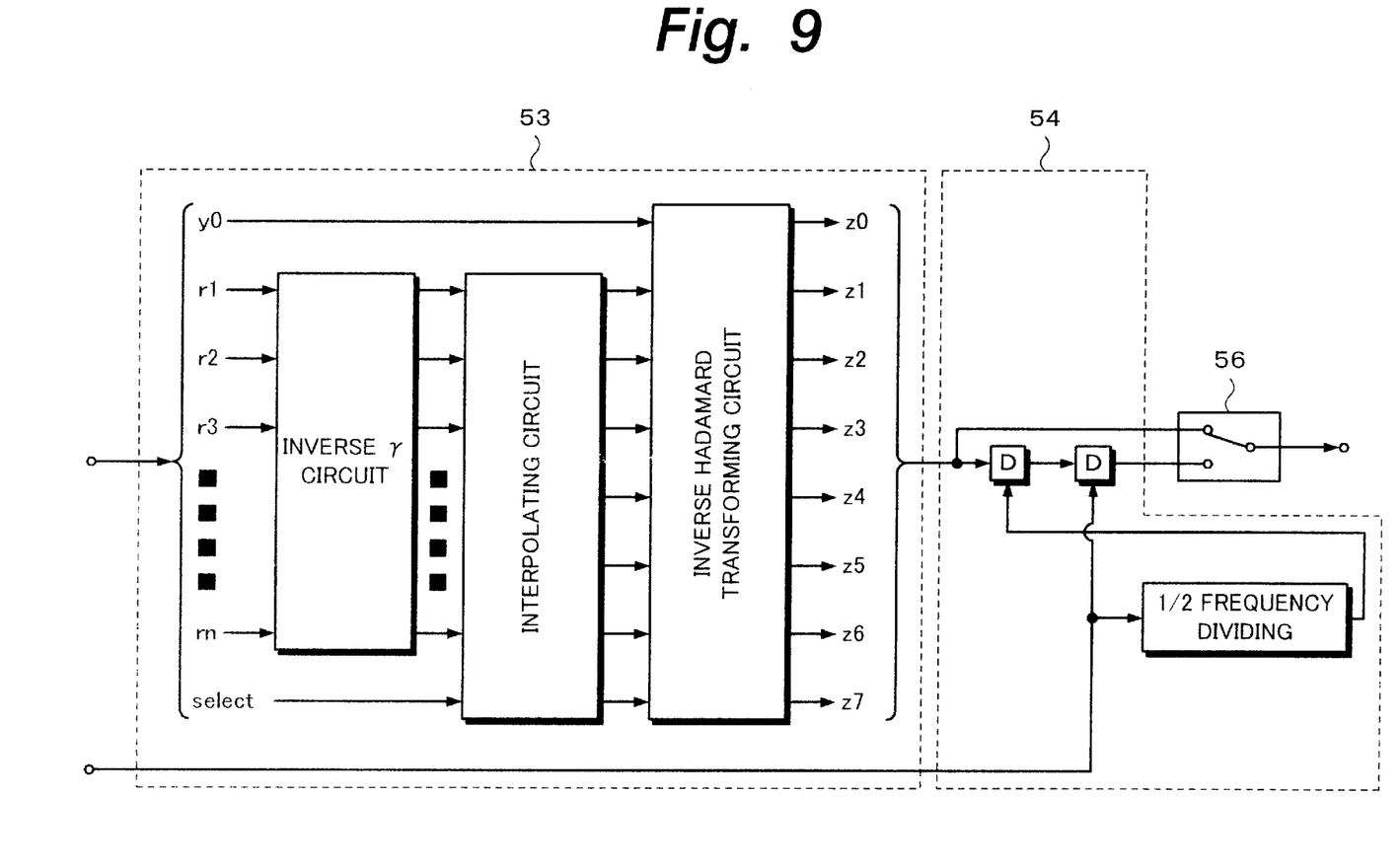
FIG. 9 is a block diagram of further another example of an image decompressing circuit in the MPEG2 decoder to which the invention is applied.

By switching switches 55 and 56 in FIGS. 8 and 9 in an interlocking manner, the compressing circuit by the band limitation can be bypassed. The resolution and quality of a compressed image can be adjusted in accordance with the capacity of the image memory 8.

According to the invention, the image data is compressed when the data of the reference picture plane is stored in the image memory which is used for motion compensation prediction. Thus, the memory capacity of the image memory which is used for motion compensation prediction can be reduced, the circuit scale can be reduced, and the costs can be shaved. In this instance, since the compression of the image data is performed independently on a unit basis of the block layer of the DCT, it can be matched with the DCT transformation and the successive processes can be performed.

INDUSTRIAL APPLICABILITY

The decoding apparatus and decoding method according to the invention as mentioned above are suitable for use in the decoding apparatus to perform the decoding of MPEG2 and, particularly, suitable to reduce the memory capacity of the image memory which is used for motion prediction.

What is claimed is:

1. A decoding apparatus comprising:

data input means for inputting image data compressed by a motion compensation predictive coding and a DCT (Discrete Cosine Transformation);

variable length decoding means for decoding various parameters and quantization DCT coefficients from the data input means;

inverse quantizing means for inversely quantizing the quantization DCT coefficients;

inverse DCT means for inversely DCT transforming the DCT coefficients which were inversely quantized;

motion compensation predicting means for obtaining a motion compensation predictive value;

arithmetic operating means for adding reference data which was motion compensated by the motion compensation predicting means and an output of the inverse DCT means;

an image memory for storing the reference data which is used for the motion compensation prediction and data for display; and data output means for outputting decoded image data, wherein the image memory comprises a front stage, for compressing the reference data for storage in the image memory, and a post stage, for decompressing the compressed reference data stored in the image memory;

wherein the front stage performs data compression based on a combination of a fixed compression system, in which a ratio of a data amount before compression and a data amount after the compression is always constant, and an orthogonal transformation; and wherein the post stage performs data decompression based on a combination of a fixed decompression system, in which a ratio of a data amount before decompression and a data amount after the decompression is always constant, and an inverse orthogonal transformation.

2. A decoding apparatus according to claim 1, wherein the front stage performs compression on a unit basis of a block layer of the DCT and the post stage performs decompression on a unit basis of a block layer of the DCT.

3. A decoding apparatus according to claim 1, wherein the fixed compression system compresses the reference data by decimating pixels on a unit basis of a block layer of the DCT and decompresses the compressed reference data by interpolating it.

4. A decoding apparatus according to claim 1, wherein the fixed compression system compresses the reference data by using average values of a plurality of pixels on a unit basis of a block layer of the DCT and in decompressing the compressed reference data repeats some of the decompressed data.

5. A decoding apparatus according to claim 1, wherein the orthogonal transformation is a Hadamard transformation and the inverse orthogonal transformation is an inverse Hadamard transformation.

6. A decoding apparatus according to claim 5, wherein the Hadamard transformation produces N AC components and wherein less than N of the AC components are selected for use in forming the compressed reference data.

7. A decoding method of decoding image data compressed by a motion compensation predictive coding and a DCT (Discrete Cosine Transformation), the method comprising the steps of:

obtaining various parameters and quantization DCT coefficients from the image data by variable length coding;

inversely quantizing the quantization DCT coefficients;

inversely DCT transforming the DCT coefficients which were inversely quantized;

performing a motion compensation prediction on the basis of predetermined parameters which were variable length decoded and outputting reference data;

arithmetically combining the outputted reference data and the inversely DCT transformed output;

compressing a result of the arithmetic operation and storing the compressed result into a reference image memory, wherein the compression is based on a combination of a fixed compression system, in which a ratio of a data amount before compression and a data amount after the compression is always constant, and an orthogonal transformation; and decompressing the data stored in the reference image memory and performing the motion compensation.

8. A decoding method according to claim 7, wherein the compression is performed on a unit basis of a block layer of the DCT.

9. A decoding method according to claim 7, wherein the fixed compression system compresses the reference data by decimating pixels on a unit basis of a block layer of the ACT.

10. A decoding method according to claim 7, wherein the fixed compression system performs compression by using average values of a plurality of pixels on a unit basis of a block layer of the DCT, and wherein decompression repetitively outputs some decompressed data.

11. A decoding method according to claim 7, wherein the orthogonal transformation is performed by a Hadamard transformation on a unit basis of a block layer of the DCT.

12. A decoding method according to claim 11, wherein the Hadamard transformation produces N AC components and wherein less than N of the AC components are selected for use in forming the compressed reference data.

13. A decoding apparatus comprising:

data input means for inputting image data compressed by a motion compensation predictive coding and a DCT (Discrete Cosine Transformation);

variable length decoding means for decoding various parameters and quantization DCT coefficients from the data input means;

inverse quantizing means for inversely quantizing the quantization DCT coefficients;

inverse DCT means for inversely DCT transforming the DCT coefficients which were inversely quantized;

motion compensation predicting means for obtaining a motion compensation predictive value;

arithmetic operating means for adding reference data which was motion compensated by the motion compensation predicting means and an output of the inverse DCT means;

an image memory for storing the reference data which is used for the motion compensation prediction and data for display; and data output means for outputting decoded image data, wherein the image memory comprises a front stage for compressing the reference data for storage in the image memory, and a post stage, for decompressing the compressed reference data stored in the image memory; and wherein the front stage performs data compression using a Hadamard transformation producing N AC components and wherein less than N of the AC components are selected for use in forming the compressed reference data.

14. A decoding method of decoding image data compressed by a motion compensation predictive coding and a DCT (Discrete Cosine Transformation), the method comprising the steps of:

obtaining various parameters and quantization DCT coefficients from the image data by variable length coding;

inversely quantizing the quantization DCT coefficients;

inversely DCT transforming the DCT coefficients which were inversely quantized;

performing a motion compensation prediction on the basis of predetermined parameters which were variable length decoded and outputting reference data;

arithmetically combining the outputted reference data and the inversely DCT transformed output;

compressing a result of the arithmetic operation and storing the compressed result into a reference image memory, wherein the compression uses a Hadamard transformation producing N AC components and wherein less than N of the AC components are selected for use in forming the compressed reference data; and storing the compressed reference data into a reference image memory; and decompressing the compressed reference data stored in the reference image memory and performing the motion compensation, wherein the decompression uses an inverse Hadamard transformation such that a value of zero is used for those N AC components not previously selected.

* * * * *